(12) United States Patent
Takei

(10) Patent No.: US 8,929,684 B2
(45) Date of Patent: Jan. 6, 2015

(54) IMAGE DISPLAY APPARATUS AND CONTROL METHOD THEREOF

(71) Applicant: Canon Kabushiki Kaisha, Tokyo (JP)

(72) Inventor: Hirofumi Takei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/661,505

(22) Filed: Oct. 26, 2012

(65) Prior Publication Data

US 2013/0050243 A1 Feb. 28, 2013

Related U.S. Application Data

(62) Division of application No. 12/389,714, filed on Feb. 20, 2009, now Pat. No. 8,379,916.

(30) Foreign Application Priority Data

Mar. 10, 2008 (JP) ................. 2008-060080

(51) Int. Cl.
*G06K 9/00* (2006.01)
*G06K 9/20* (2006.01)
*G09G 5/00* (2006.01)
*G06F 17/30* (2006.01)

(52) U.S. Cl.
CPC ..................... *G06F 17/30* (2013.01)
USPC ............ 382/282; 382/103; 382/118; 345/642

(58) Field of Classification Search
CPC ........................................... H04N 2005/44595
USPC .......... 382/103, 181, 205, 118, 282; 345/589, 345/642

See application file for complete search history.

(56) References Cited

U.S. PATENT DOCUMENTS

| | | | | |
|---|---|---|---|---|
| 5,616,930 A | * | 4/1997 | Janssens et al. | 250/584 |
| 6,222,532 B1 | * | 4/2001 | Ceccarelli | 715/723 |
| 6,466,237 B1 | * | 10/2002 | Miyao et al. | 715/838 |
| 6,731,778 B1 | * | 5/2004 | Oda et al. | 382/118 |
| 6,792,135 B1 | * | 9/2004 | Toyama | 382/118 |
| 7,324,749 B2 | * | 1/2008 | Kubo | 396/429 |
| 7,701,471 B1 | * | 4/2010 | Young et al. | 345/629 |
| 7,965,310 B2 | * | 6/2011 | Endsley et al. | 348/14.16 |
| 8,116,539 B2 | * | 2/2012 | Nishijima | 382/118 |
| 8,643,729 B2 | * | 2/2014 | Wang et al. | 348/208.1 |
| 8,744,142 B2 | * | 6/2014 | Murakami | 382/118 |
| 2003/0025676 A1 | * | 2/2003 | Cappendijk | 345/173 |
| 2003/0043149 A1 | * | 3/2003 | Safadi et al. | 345/428 |
| 2004/0208388 A1 | * | 10/2004 | Schramm et al. | 382/254 |

(Continued)

*Primary Examiner* — Michelle Entezari
(74) *Attorney, Agent, or Firm* — Cowan, Liebowitz & Latman, P.C.

(57) ABSTRACT

When an area in a first image is specified, an amounts of characteristics of image data included in the area and a neighboring area are detected and it is determined based on the amount of the characteristics whether or not a notification display indicating that the area is likely not to be a target area needs to be presented. If it is determined that the notification display needs to be displayed, a notification image that enables the area to be identified is generated for the first image and is combined with a second image to generate a composite image and the composite image is displayed on a display unit. On the other hand, if it is determined that the specified area is likely to be a target area, the second image based on the image data included in the area is displayed over the full screen of the display unit.

9 Claims, 15 Drawing Sheets

(56) References Cited

U.S. PATENT DOCUMENTS

| | | | |
|---|---|---|---|
| 2005/0047659 A1* | 3/2005 | Tanaka | 382/170 |
| 2005/0143136 A1* | 6/2005 | Lev et al. | 455/566 |
| 2005/0190280 A1* | 9/2005 | Haas et al. | 348/333.05 |
| 2005/0219265 A1* | 10/2005 | Itoh et al. | 345/629 |
| 2005/0232493 A1* | 10/2005 | Satou et al. | 382/209 |
| 2006/0153429 A1* | 7/2006 | Gehlen et al. | 382/118 |
| 2006/0198554 A1* | 9/2006 | Porter et al. | 382/159 |
| 2006/0274960 A1* | 12/2006 | Tamaru | 382/274 |
| 2007/0053660 A1* | 3/2007 | Abe et al. | 386/95 |
| 2007/0292000 A1* | 12/2007 | Ito et al. | 382/118 |
| 2008/0025558 A1* | 1/2008 | Nozawa | 382/100 |
| 2009/0058822 A1* | 3/2009 | Chaudhri | 345/173 |

\* cited by examiner

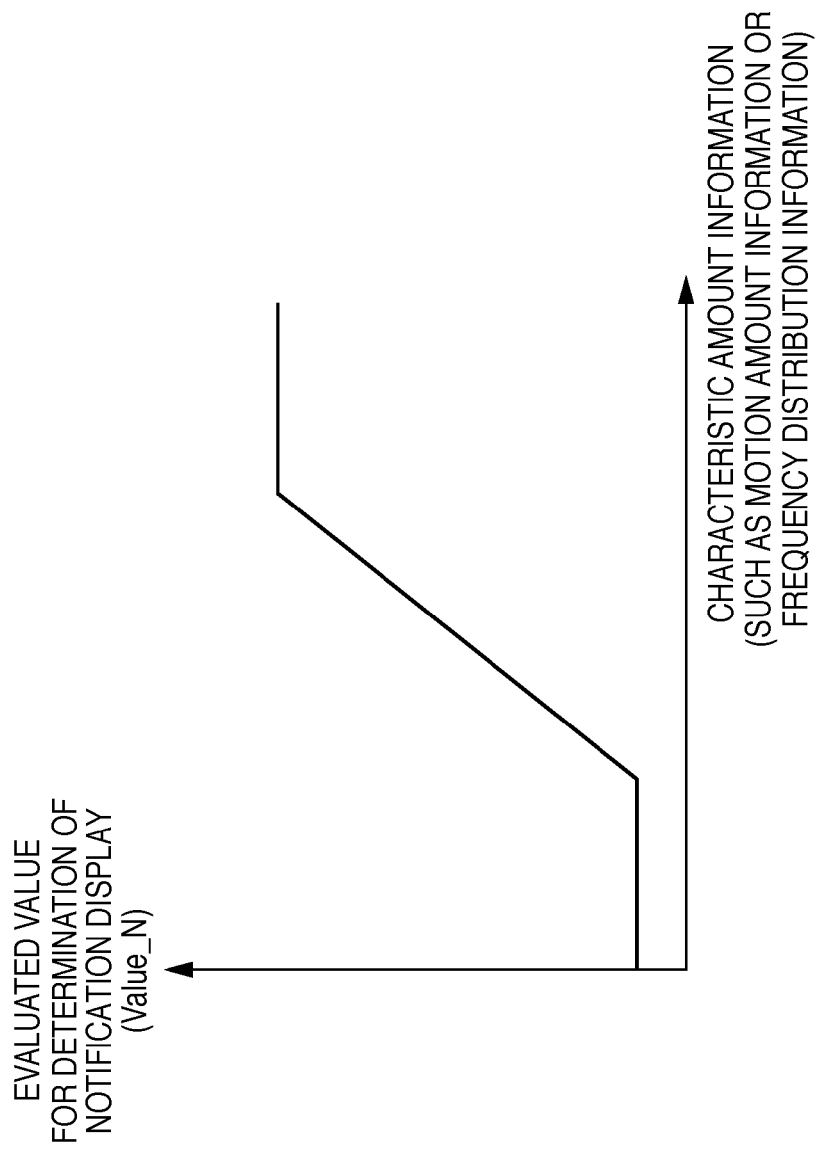

IMAGE DISPLAY APPARATUS AND CONTROL METHOD THEREOF

CROSS-REFERENCE TO RELATED APPLICATIONS

This application is a divisional of application Ser. No. 12/389,714, filed Feb. 20, 2009 the entire disclosure of which is hereby incorporated by reference.

BACKGROUND OF THE INVENTION

1. Field of the Invention

The present invention relates to an image display apparatus for displaying an image and a control method of the image display apparatus and, in particular, to a technique for extracting and displaying an area from an image.

2. Description of the Related Art

Techniques for extracting an area from an input image and displaying the area on a display screen have been put into practical use. Japanese Patent Laid-Open No. 05-337077 proposes such a display apparatus.

A problem with the technique disclosed in Japanese Patent Laid-Open No. 05-337077 will be described below. The technique disclosed in Japanese Patent Laid-Open No. 05-337077 extracts and enlarges a desired area from an input original image and displays the area as a main window. A sub-window displaying the original image is displayed in a portion of the main window so that the original image (sub-window) is superimposed on the image extracted and enlarged from the original image. The technique in Japanese Patent Laid-Open No. 05-337077 displays the sub-window all the time while the area extracted and enlarged from the input original image is displayed as the main window, regardless of whatever is contained in the main window. This is because the sub-window displaying the original image is superimposed on the image of the extracted area in order to enable an operator to readily identify which portion of the original image corresponds to the area extracted and enlarged from the original image. Accordingly, even when the enlarged image displayed in the main window is of interest to the operator and the operator can perform manipulations on the display of the main window alone without any difficulty, a portion of the main window is always occupied by the sub-window displaying the original image. Therefore, there is a problem that the overall main window enlarged cannot completely be viewed because the sub-window interferes with viewing of the image in the main window.

SUMMARY OF THE INVENTION

An aspect of the present invention is to eliminate the above-mentioned problems with the conventional technology.

A feature of the present invention is to determine whether or not an area extracted from an original image is to be a target area, and if the area is likely to be the target area, only the image in the area is displayed; otherwise, notification display is presented indicating as such to allow an operator to recognize the fact.

Another feature of the present invention is to provide an image display and control method thereof which display an image in an area, if the image in the currently extracted area is likely to be in a target area, and the image in the target area is not interfered by another image.

According to an aspect of the present invention, there is provided an image display apparatus comprising: a specifying unit configured to specify an area in a first image; an extraction unit configured to extract image data included in the area specified by the specifying unit; a display controlling unit configured to control to cause a second image based on the image data extracted by the extraction unit to be displayed on a display unit; a detection unit configured to detect an amount of characteristics of image data included in the area and image data in a neighboring area of the area; a determination unit configured to determine, on the basis of the amount of characteristics detected by the detection unit, whether or not a notification display indicating that the area specified by the specifying unit is likely not to be a target area needs to be presented; an image generation unit configured to generate a notification image enabling the area to be identified with respect to the first image, in a case that the determining unit determines that notification display needs to be presented; and a synthesizing unit configured to combine the notification image generated by the image generation unit with the second image to generate a composite image and displaying the composite image on the display unit; wherein if the area specified by the specifying unit is likely to be the target area, the second image is displayed over the full screen of the display unit.

According to another aspect of the present invention, there is provided a control method for controlling an image display apparatus, comprising the steps of: specifying an area in a first image; extracting image data included in the area specified in the specifying step; displaying a second image based on the image data extracted in the extracting step on a display unit; detecting an amount of characteristics of image data included in the area and image data in a neighboring area of the area; determining, on the basis of the amount of the characteristic detected in the detecting step, whether or not a notification display indicating that the area specified in the specifying step is likely not to be a target area needs to be presented; generating a notification image enabling the area to be identified with respect to the first image in a case that it is determined in the determining step that the notification display needs to be presented; and combining the notification image generated in the image generating step with the second image to generate a composite image and displaying the composite image on the display unit; wherein if the area specified in the specifying step is likely to be a target area, the second image is displayed over the full screen of the display unit.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 22 is an exemplary graph of characteristic amount information versus evaluated value for determination of that a notification display is displayed or not.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
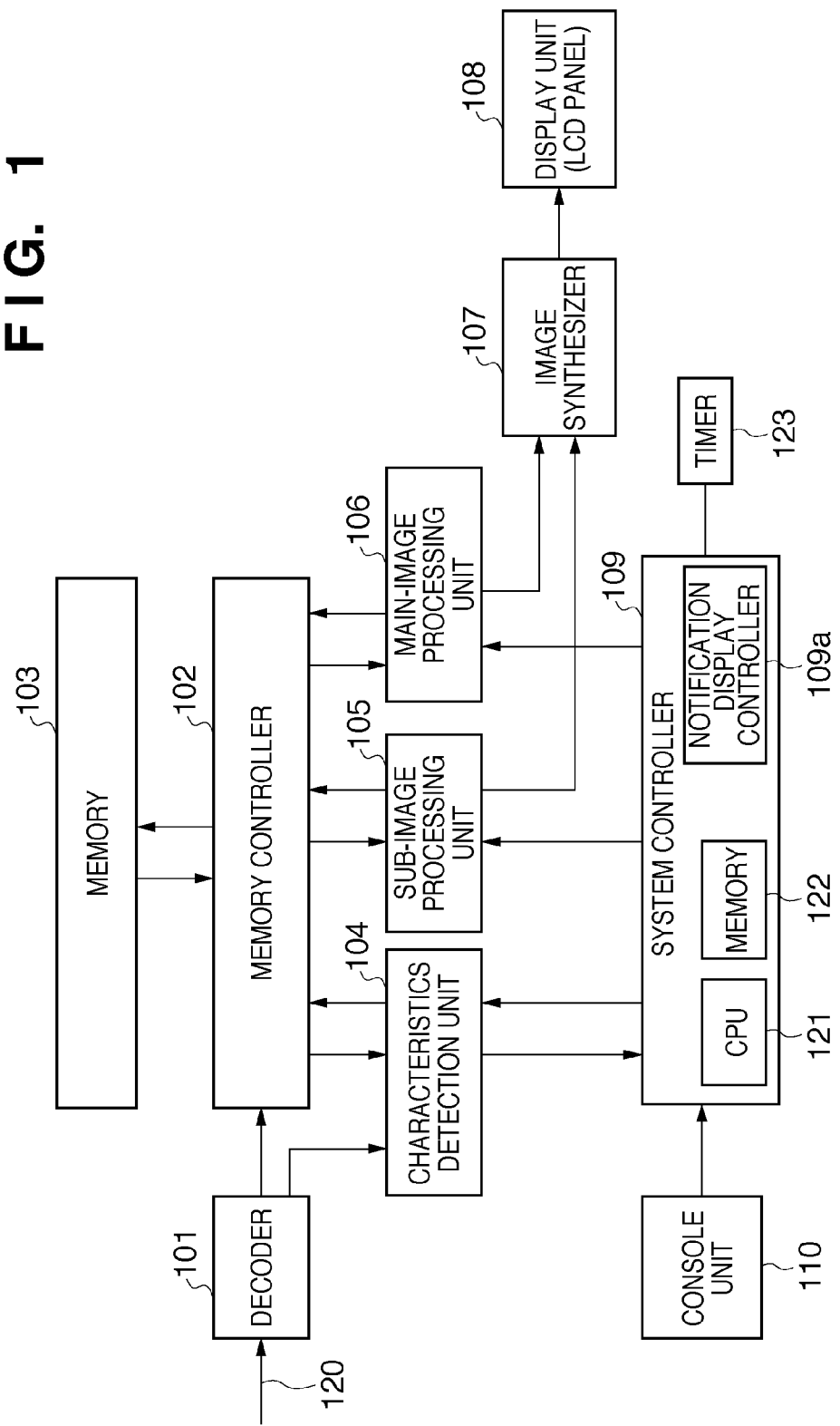
FIG. 1 is a block diagram showing a functional configuration of an image display apparatus according to an exemplary embodiment of the present invention.

FIG. 1 is a block diagram showing a functional configuration of an image display apparatus according to an exemplary embodiment of the present invention. The image display apparatus is capable of extracting and displaying a desired area from an input image.

In FIG. 1, a decoder 101 decodes an input image stream (first image) 120 into a base-band image signal and output the image signal as image data. A memory controller 102 controls writing image data output from the decoder 101 into a memory 103 and reading image data from the memory 103. The memory 103 stores image data under the control of the memory controller 102. A characteristics detection unit 104 detects an amounts of characteristics of an image on the basis of information such as a motion vector and a discrete coefficient transform (DCT) coefficient output from the decoder 101. A sub-image processing unit 105 functions as an image generating unit that generates image data for displaying a notification image, which will be described later. A main-image processing unit 106 generates image data for a main display image (second image) to be displayed on a display unit 108 based on image data in an extracted image area. An image synthesizer 107 inputs main image data generated by the main-image processing unit 106 and sub-image data generated by the sub-image processing unit 105 and combines them so as to output the combined image data to the display unit 108. The display unit 108 displays an image based on composite image data output from the image synthesizer 107. A system controller 109 controls the entire image display apparatus and includes a notification display controller 109a, which will be described later. The system controller 109 includes a CPU 121 and a memory 122 such as a RAM that stores a program executed by the CPU 121 and provides a work area temporarily storing various kinds of data. A console unit 110 includes a keyboard or a pointing device used for inputting instructions for various operation into the image display apparatus. The console unit 110 can be used to perform an operation to specify an area (hereinafter referred to as an "image area") from which image data to be displayed as a main image, which will be described later, is extracted. A timer 123 measures time and indicates measured time period to the system controller 109.

Operation of the image display apparatus having the configuration described above will be described.

First, an image stream 120 input from a television tuner or an external input terminal is provided to the decoder 101. The decoder 101 decodes the input image stream 120 into baseband image data. It is assumed in the description of the embodiment that the input image stream 120 is image data encoded in MPEG-2, which is a common image compression format. The decoder 101 outputs the decoded base- and image data and information such as a motion vector and a DCT coefficient contained in the input MPEG-2 image stream.

The memory controller 102 stores the image data input from the decoder 101 in the memory 103. In response to a request from any of the characteristics detection unit 104, the sub-image processing unit 105, and the main-image processing unit 106, the memory controller 102 reads image data stored in the memory 103 and provides the image data to the characteristics detection unit 104, the sub-image processing unit 105, or the main-image processing unit 106 requesting the image data. Input data of the characteristics detection unit 104 is a motion vector, DCT coefficient, and other information output from the decoder 101. Also input in the characteristics detection unit 104 includes information indicating an image area (hereinafter referred to as area information) to be extracted that is specified at the console unit 110, from the system controller 109. The area information is input by using a key or touch pen, for example, on the console unit 110. The area information is also input into the sub-image processing unit 105 and the main-image processing unit 106. The characteristics detection unit 104 uses the area information input from the system controller 109 and the above-mentioned motion vector and DCT coefficient and image data from the memory 103 to detect the amounts of characteristics relating to the images in the image area to be extracted and its neighboring areas. The amounts of characteristics detected by the characteristics detection unit 104 according to the embodiment include luminance and color signal variance values of the image and information indicating motion of a subject which can be obtained from the motion vector. The amounts of characteristics also include the frequency distribution of the image which can be obtained from the DCT coefficient and other information such as face detection information in the image data.

As face detection methods using image data, algorithms using the hue of a face image and a structure specific to a human face image such as eyes, nose, and mouth have been proposed and have already been put into practical use for face detection in mobile devices. The characteristic amount detection in the present embodiment is not limited to face detection. The algorithms for face detection are well-known and therefore detailed description thereof will be omitted herein. The multiple items of characteristic amount information detected by the characteristics detection unit 104 are input in the system controller 109.

Operation of the sub-image processing unit 105 will be described.

The sub-image processing unit 105 generates area image data for a notification image from area information input from the system controller 109 and information from the notification display controller 109a, which will be described later. Exemplary notification images in the present embodiment will be described later.

The main-image processing unit 106 extracts image data in a specified area from image data output from the decoder 101 based on the area information. The image data extracted by the main-image processing unit 106 is scaled to the number of pixels of the display unit 108. For example, if the number of pixels of the image data in the extracted area is smaller than the number of pixels that can be displayed on the screen of the display unit 108, the extracted image data is up-sampled (enlarged) to match the number of pixels of the image data to that of the display unit 108 for display. If the number of pixels of the extracted image data is greater than the number of pixels of the screen of the display unit 108, the image data is down-sampled (reduced) to match the number of pixels of the image data to that of the display unit 108 for display. If the number of pixels of the extracted image data is equal to the number of pixels of the display unit 108, the extracted image data may be displayed on the display unit 108 without sampling.

The image synthesizer 107 combines the image data output from the sub-image processing unit 105 with that from the main-image processing unit 106 under the control of the system controller 109. The composite image data is output to the display unit 108 including an LCD panel or other display and is displayed as a visible image.

Operation of the notification display controller 109a according to the present embodiment will be described next.

The notification display controller 109a inputs multiple items of characteristic amount information relating to an extracted image area and its neighboring areas from the characteristics detection unit 104 as described above. The notification display controller 109a uses these items of characteristic amount information to control a notification display.

Operation of the notification display controller 109a according to the present embodiment will be described with reference to flowcharts of FIGS. 2 to 7. A program performing these processes is installed in a hard disk drive (not shown) or the like of the image display apparatus and is loaded into the memory 122 at execution and is executed under the control of the CPU 121.

Figure 2:
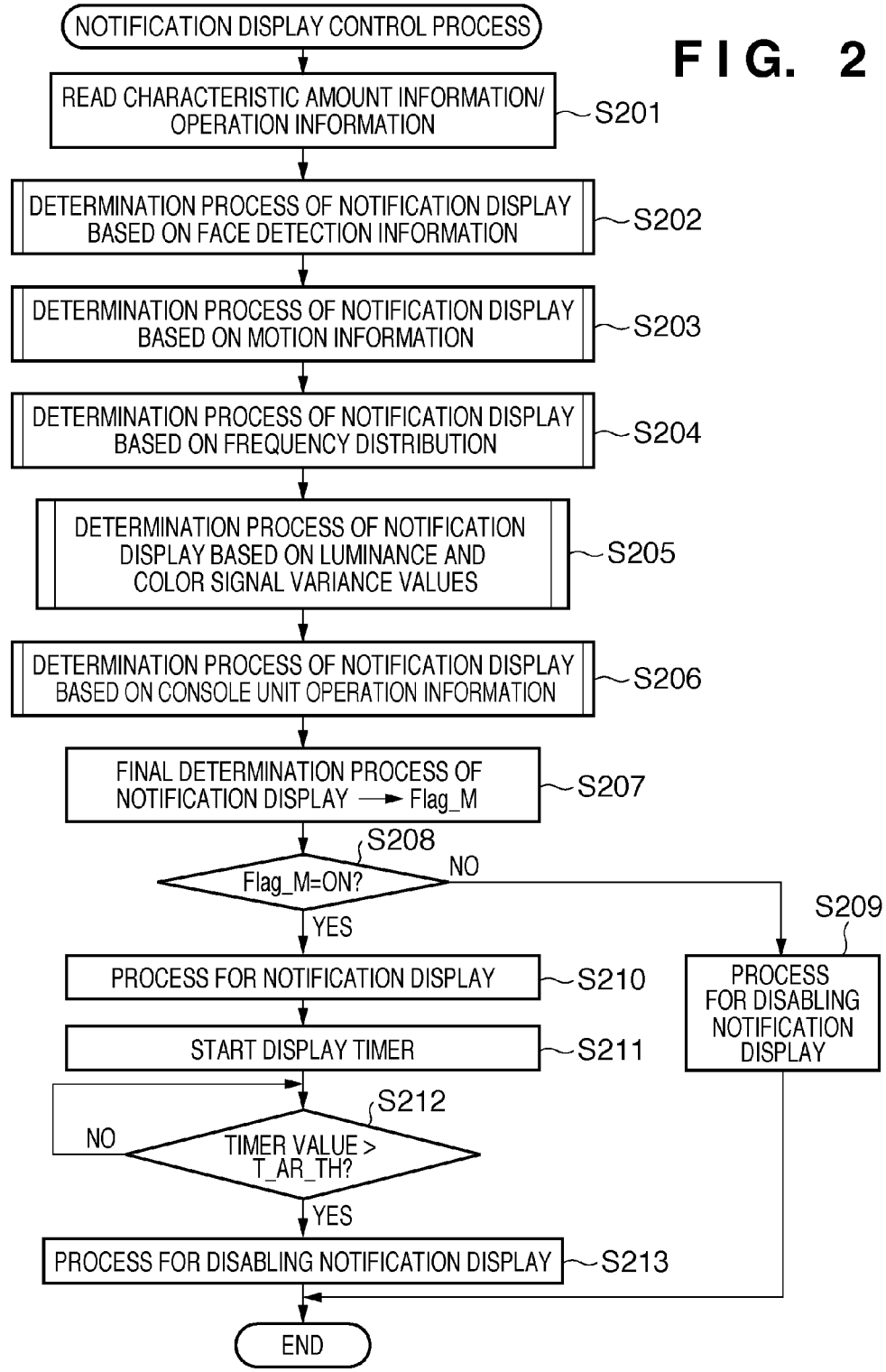
FIG. 2 is a flowchart explaining operation of a system controller according to the present embodiment.

FIG. 2 is a flowchart explaining operation of the notification display controller 109a of the system controller 109 according to the present embodiment. FIGS. 3 to 7 are flowcharts illustrating operation for determining whether to present notification display on the basis of various items of characteristic amount information and information on an operation performed at the console unit 110.

In the present embodiment, face detection information, motion information, frequency distribution and luminance and color signal variance values of an image are used as the multiple items of characteristic amount information. The information from the console unit 110 is information on an operation for selecting an image area as described above. In the present embodiment, these items of information are used to detect that an image area specified on the console unit 110 is likely not to be an area of interest (target area) or that it is likely to be difficult to identify which area is an area of interest (target area) in the input image data. When such a likeliness is detected, operation for displaying a notification image is executed.

In FIG. 2, when notification display control is initiated, multiple items of characteristic amount information from the characteristics detection unit 104 and operation information from the console unit 110 are first read in step S201. In steps S202 to S206, processing is performed for determining, on the basis of the input items of characteristic amount information, whether a notification image should be displayed or not. These steps are detailed in the flowcharts in FIGS. 3 to 7.

In step S202, it is determined based on the face detection information whether the notification display should be presented or not. It is determined in step S203 based on the input motion information whether the notification display should be presented or not. It is determined in step S204 based on the input frequency distribution information whether the notification display should be presented or not. In step S205, it is determined based on the input luminance and color signal variance values (histogram information) whether the notification display should be presented or not. In step S206, it is determined based on the input console unit operation information whether the notification display should be presented or not.

Process in steps S202 to S206 of FIG. 2 will be described in detail. Flags (Flag_1, Flag_2, Flag_3, Flag_4, and Flag_5), which will be described below, are provided in the memory 122. It is assumed here that any of the flags is set to "1" (ON) to turn on the flag and set to "0" (OFF) to turn off the flag.

Figure 3:
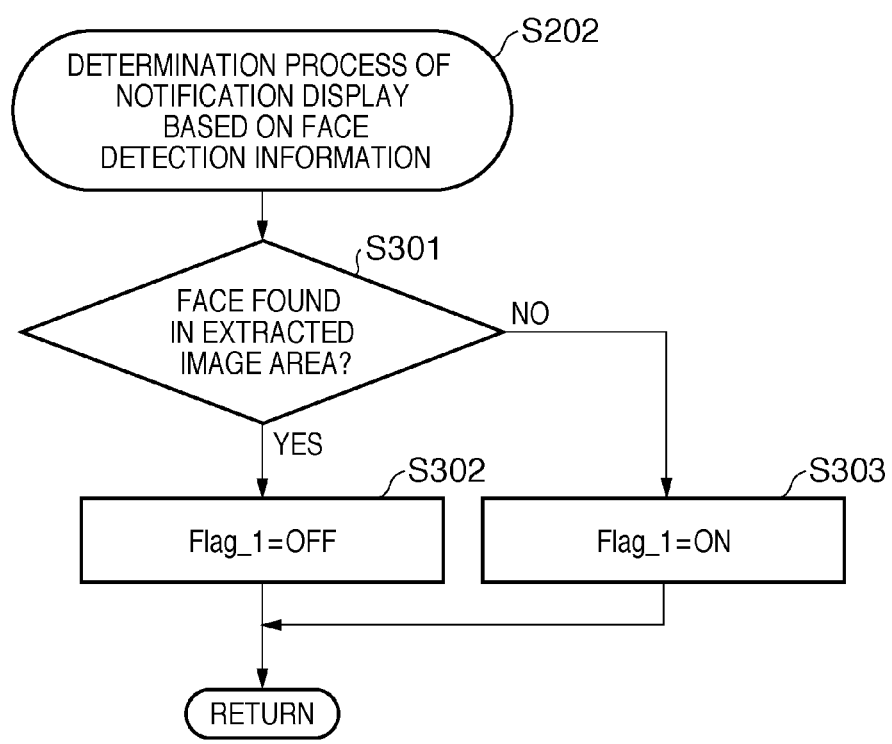
FIG. 3 is a flowchart explaining details of a process in step S202 of FIG. 2 for determining, on the basis of face detection information, whether notification display should be presented or not.

FIG. 3 is a flowchart showing details of the process performed in step S202 of FIG. 2 for determining whether or not the notification display should be presented, on the basis of face detection information.

First, it is determined in step S301 whether or not a human face is detected in the extracted image area. If it is determined that a human face is detected in the image area, the process proceeds to step S302, where a flag (Flag_1) indicating the result of notification display/non-display determination based on face detection information is set to OFF ("0") to indicate that the notification display does not need to be presented. On the other hand, if a human face is not detected in the image area in step S301, the process proceeds to step S303, where the flag (Flag_1) is set to ON ("1") to indicate that the notification display needs to be presented.

If a human face is not detected in the image area in the process shown in FIG. 3, it is determined that the image area is likely not to be an area of interest and the flag (Flag_1) is set to ON ("1"). If a face is detected in the image area, it is determined that the image area is likely to be an area of interest and the flag (Flag_1) is set to OFF ("0").

Figure 4:
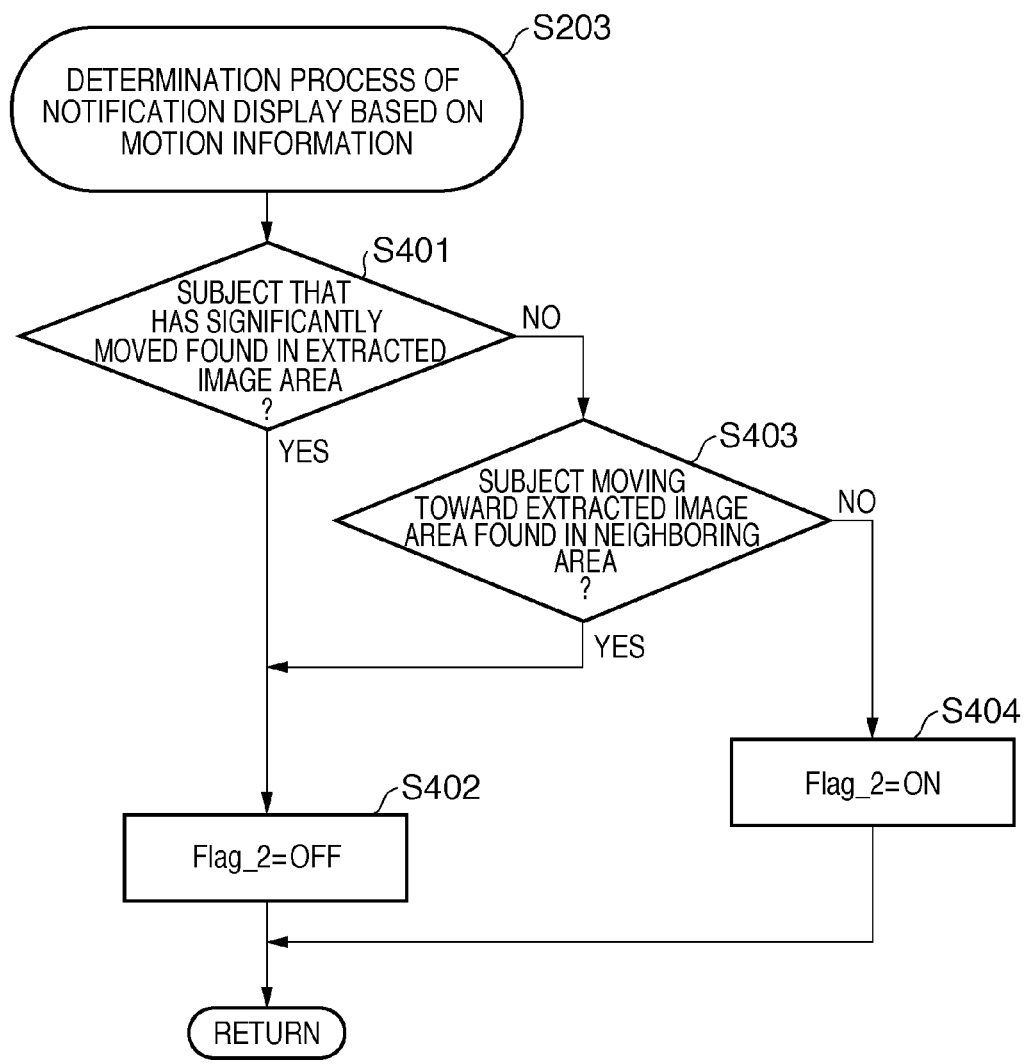
FIG. 4 is a flowchart explaining details of a process in step S203 of FIG. 2 for determining, on the basis of motion information, whether notification display should be presented or not.

FIG. 4 is a flowchart showing details of the process of the process performed in step S203 of FIG. 2, for determining on the basis of motion information whether notification display should be presented or not.

In step S401, it is determined whether or not there is a subject in the extracted area that has significantly moved (that has a motion component). If it is determined that there is a subject that has significantly moved in the image area, the process proceeds to step S402, where a flag (Flag_2) indicating the result of notification display/non-display determination based on motion information is set to OFF ("0") to indicate that notification display does not need to be presented. On the other hand, if it is determined in step S401 that a subject that has significantly moved is not detected in the image area, the process proceeds to step S403, where motion information in neighboring areas of the image area (neighboring areas) is used to determine whether there is a subject that has a motion component toward the interior of the image area. If it is determined that there is a subject that has a motion component toward the interior of the image area, the process proceeds to step S402 described above, where the flag (Flag_2) is set to OFF ("0"). On the other hand, if it is determined in step S403 that there is not a subject that has a motion component toward the interior of the image area, the process proceeds to step S404, where the flag (Flag_2) is set to ON ("1") to indicate that notification display needs to be presented.

If a subject that has significantly moved is not found in the image area and its neighboring areas by the process shown in FIG. 4, it is presumed that the image area is unlikely to be an area of interest and therefore it is determined that the notification display needs to be presented. The flag (Flag_2) indicating that the notification display needs to be presented is set to ON ("1"). On the other hand, if a subject that has significantly moved is found in the image area, or a motion component of a subject moving toward the image area is detected in the neighboring areas, it is likely that the image area will become an area of interest. Therefore, it is determined that the notification display does not need to be presented and the flag (Flag_2) indicating that is set to OFF ("0").

Figure 5:
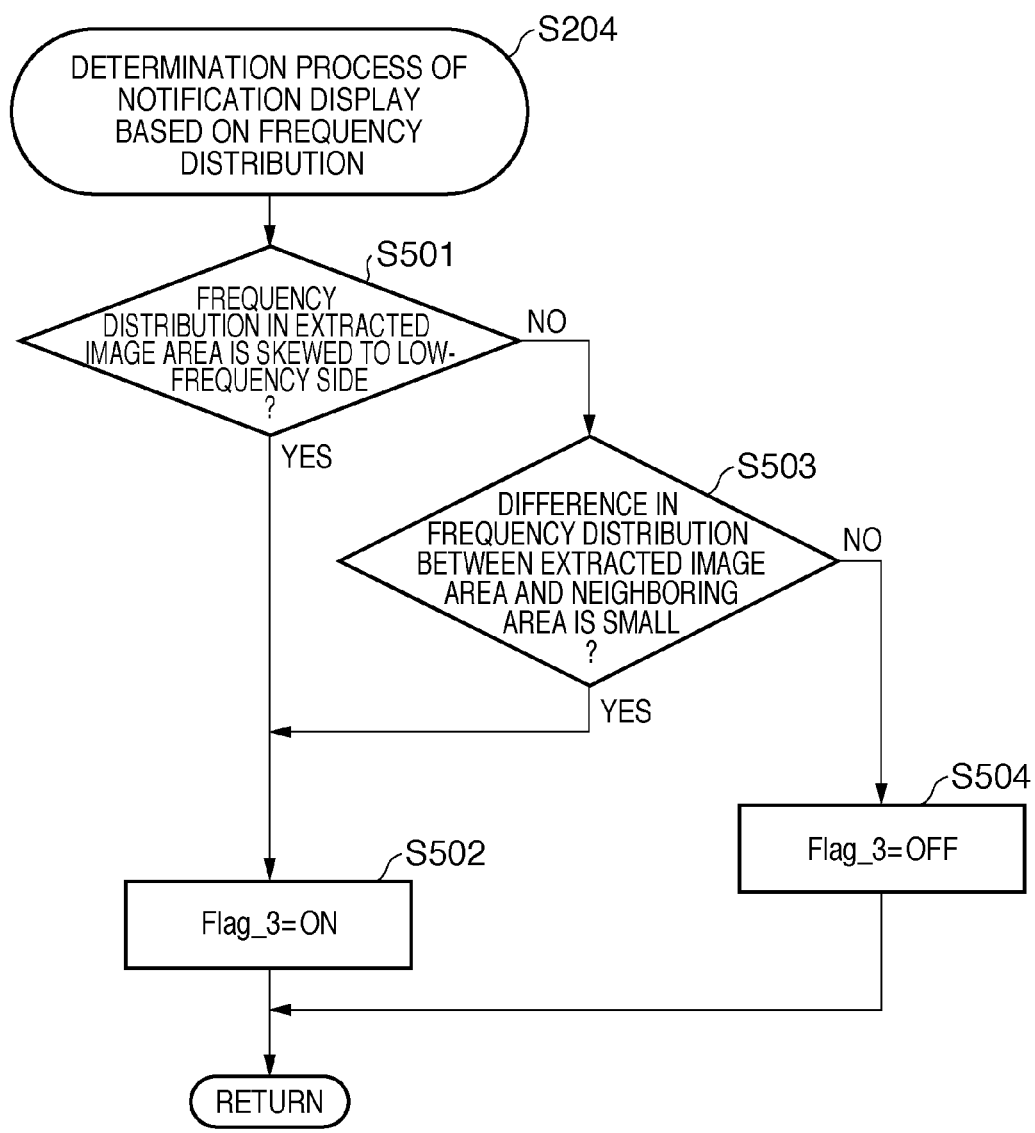
FIG. 5 is a flowchart explaining details of a process in step S204 of FIG. 2 for determining, on the basis of frequency distribution information, whether notification display should be presented or not.

FIG. 5 is a flowchart showing details of the process performed in step S204 of FIG. 2 for determining, on the basis of frequency distribution, whether the notification display should be presented or not.

First, it is determined in step S501 whether or not the frequency distribution in the extracted image area is skewed to the low-frequency side. If it is determined that the frequency distribution in the image area is skewed to the low-frequency side, that is, the image in the area is flat, the process proceeds to step S502, where a flag (Flag_3) indicating the result of notification display/non-display determination based on frequency distribution is set to ON ("1") to indicate that the notification display needs to be presented. On the other hand, if it is determined in step S501 that the frequency distribution in the image area is not skewed to the low-frequency side, the process proceeds to step S503. In step S503, it is determined whether or not the difference in frequency distribution between the image area and its neighboring areas is less than or equal to a predetermined value, that is, small or not. If it is determined that the difference is small, the process proceeds to step S502, where the flag (Flag_3) is set to ON ("1"). On the other hand, if it is determined in step S503 that the difference is greater than the predetermined value, the process proceeds to step S504, where the flag (Flag_3) is set to OFF ("0") to indicate that the notification display does not need to be presented.

If it is determined in the process shown in FIG. 5 that the frequency distribution in the image area is skewed to the low-frequency side, that is, the image in the area is flat, it is presumed that the image area is likely not to be an area of interest and it is determined that the notification display needs to be presented. If the image area is not flat but the difference in frequency distribution between the image area and its neighboring areas is small, it is presumed that identification of an image area is difficult and determined that the notification display needs to be presented, and therefore the flag (Flag_3) is set to ON ("1"). If the image in the image area is not flat, or the difference in frequency distribution between the image area and its neighboring areas is large, it is determined that the notification display does not need to be presented and the flag (Flag_3) is set to OFF ("0").

Figure 6:
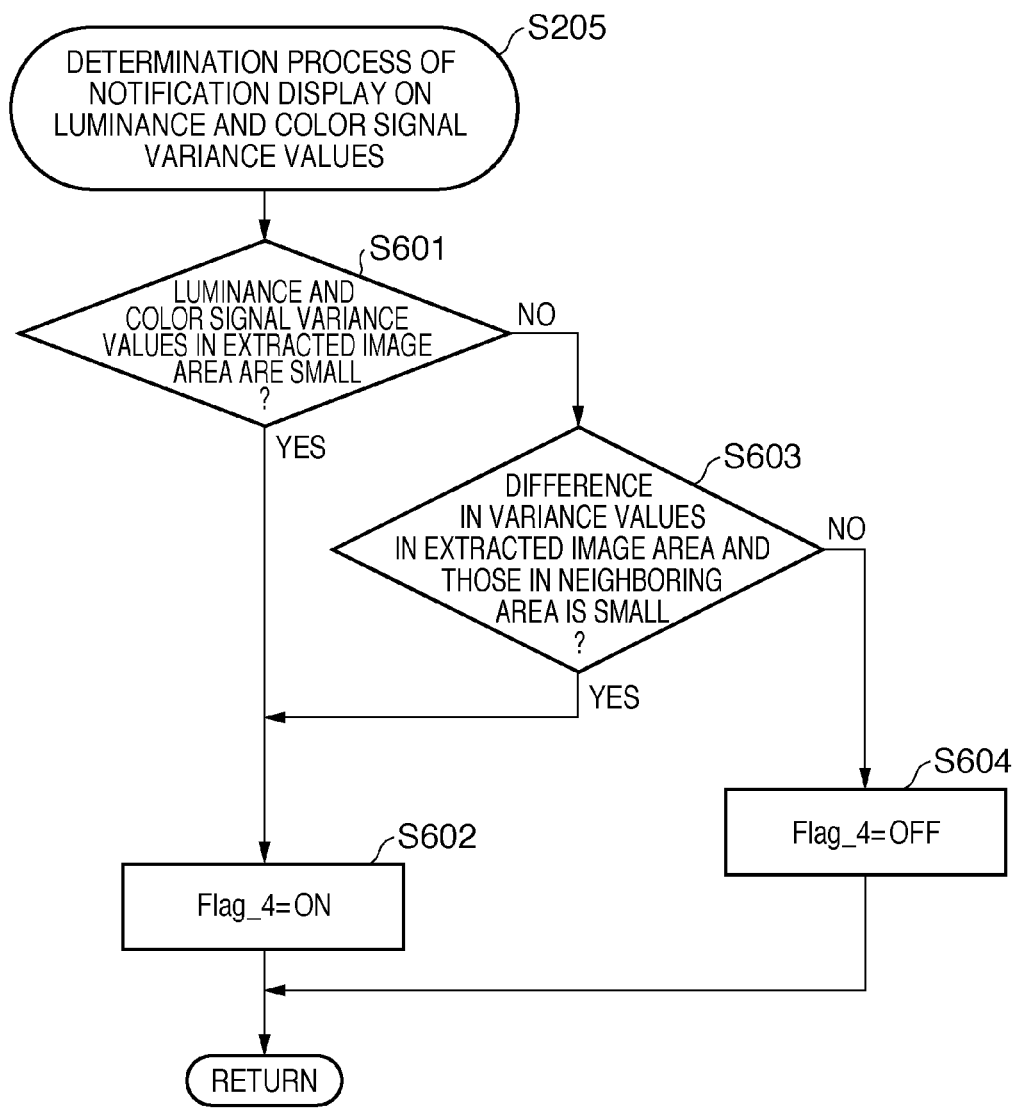
FIG. 6 is a flowchart explaining details of a process in step S205 of FIG. 2 for determining, on the basis of luminance and color signal variance information, whether notification display should be presented or not.

FIG. 6 is a flowchart showing details of the process in step S205 of FIG. 2 for determining, on the basis of luminance and color signal variance information, whether notification display should be presented or not.

First, it is determined in step S601 whether or not the luminance and color signal variance values in the extracted image area are lower than or equal to a predetermined value, that is, whether the variance values are small. If it is determined that the luminance and color signal variance values in the image area are smaller than or equal to the predetermined value, that is, the amounts of changes in intensity and color in the image area are small, the process proceeds to step S602. In step S602, a flag (Flag_4) indicating the result of notification display/non-display determination based on luminance and color signal variance values is set to ON ("1") to indicate that the notification display need to be presented.

On the other hand, if it is determined in step S601 that the luminance and color signal variance values in the image area are greater than the predetermined value, the process proceeds to step S603. In step S603, determination is made as to whether the differences in luminance and color signal variance values between the image area and its neighboring areas are small or not. If it is determined in step S603 that the differences are small, the process proceeds to step S602 described above, where the flag (Flag_4) is set to ON ("1") to indicate that the notification display needs to be presented. On the other hand, if it is determined in step S603 that the differences are large, the process proceeds to step S604, where the flag (Flag_4) is set to OFF ("0") to indicate that the notification display does not need to be presented.

If it is determined by the process shown in FIG. 6 that the signal variance values are small, that is, the amounts of change in the intensity and color in the image area are small, it is presumed that the image area is likely not to be an area of interest and determined that the notification display needs to be presented. Also, if it is determined that the amounts of changes in intensity and color in the image area are not small but the difference between the image area and its neighboring areas are small, it is presumed that identification of an image area is difficult and determined that the notification display needs to be presented. Based on the result of the determination, the flag (Flag_4) is set to ON ("1"). If the amounts of change in the intensity and color in the image area are large, or the difference between the image area and its neighboring areas are large, it is determined that the notification display does not need to be presented, and therefore the flag (Flag_4) is set to OFF ("0").

Figure 7:
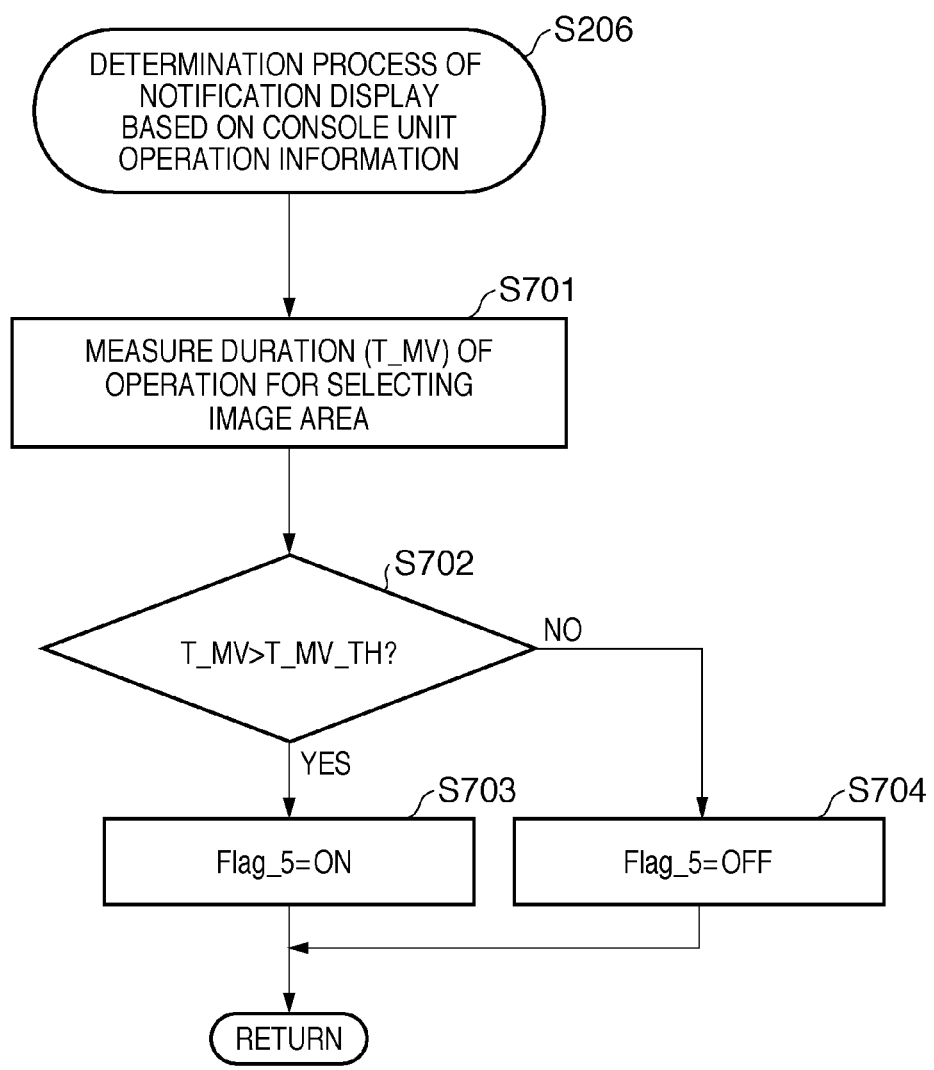
FIG. 7 is a flowchart showing details of a process in step S206 of FIG. 2 for determining, on the basis of console unit operation information, whether notification display should be presented or not.

FIG. 7 is a flowchart showing details of the process at S206 of FIG. 2 for determining, on the basis of console unit operation information, whether notification display should be presented or not.

First, the duration (T_MV) of an operation for selecting an extracted image area is measured in step S701. The process proceeds to step S702, where it is determined whether or not the measured duration (T_MV) is longer than a predetermined time (T_MV_TH). If it is determined in step S702 that the duration (T_MV) is longer than (greater than or equal to) the predetermined time (T_MV_TH), the process proceeds to step S703, where a flag (Flag_5) indicating the result of notification display/non-display determination based on the duration of operation is set to ON to indicate that the notification display needs to be presented. On the other hand, if it is determined in step S702 that the duration (T_MV) is shorter than the predetermined time (T_MV_TH), the process proceeds to step S704, where the flag (Flag_5) is set to OFF ("0") to indicate that the notification display does not need to be presented.

If it is determined by the process shown in FIG. 7 that the operation for selecting the image area has continued for a duration longer than the predetermined time, it is determined that the operator is undecided whether to choose the image area and that the notification display needs to be presented. Based on the result of the determination, the flag (Flag_5) is set to ON ("1"). On the other hand, if the duration of the operation is shorter than the predetermined time, it is determined that the operator has promptly decided to choose the image area and that the notification display does not need to be presented. Consequently, the flag (Flag_5) is set to OFF ("0").

After completion of the process in steps S202 to S206 of FIG. 2 described above, the process proceeds to step S207 of FIG. 2.

Based on the results of determination in steps S202 to S206, the final determination of a notification display/non-display is made in step S207 of FIG. 2. The result is stored in a final notification display/non-display determination result flag (Flag_M). The notification display/non-display final determination process is a process for determining which of the notification display/non-display determination result flags (Flag_1 to Flag_5) described above should be reflected in the actual notification display.

For example, the final notification display/non-display determination result flag (Flag_M) is calculated according to a logical equation of determination result mask flags (MASK_1 to MASK_5) and the notification display/non-display determination result flags (Flag_1 to Flag_5) as shown in Equation (1). This enables determination by selectively combining the amounts of multiple characteristics.

Flag_M=(MASK_1*Flag_1)+(MASK_2*Flag_2)+(MASK_3*Flag_3)+(MASK_4*Flag_4)+(MASK_5*Flag_5)   Equation (1)

For example, if the operator wants to reflect all determinations made in steps S202 to S206 on the notification display, the values of MASK_1 to MASK_5 are all set to "1" (ON). In this case, if one of the flags Flag_1 to Flag_5 is set to ON (=1), then Flag_M also is set to ON (=1).

If the operator wants to reflect only the result of notification display/non-display determination based on face information (Flag_1), for example, on the notification display, only the value of MASK_1 is set to "1" (ON) and the values of the other mask flags MASK_2 to MASK_5 are set to "0" (OFF).

The determination results mask flags (MASK_1 to MASK_5) given above may be separately input through the console unit 110 of the image display apparatus or desired values of the mask flags may be stored in a memory such as a nonvolatile memory, not shown.

After the final notification display/non-display determination result flag (Flag_M) is calculated in step S207, the process proceeds to step S208. In step S208, it is determined based on the value of the flag (Flag_M) whether or not to present the notification display. If the flag (Flag_M) is OFF ("0") in step S208, the process proceeds to step S209, where the notification display is disabled, then the process will end.

If the notification display is disabled, the sub-image processing unit 105 does not generate notification image data. Accordingly, only the image data output from the main-image processing unit 106 is output from the image synthesizer 107 and is displayed over the full screen of the display unit 108.

On the other hand, if the flag (Flag_M) is ON ("1") in step S208, the process proceeds to step S210, where the notification display is enabled.

When the notification display is to be presented, notification image data generated by the sub-image processing unit 105 is combined with the main image by the image synthesizer 107 and the composite image is displayed on the display unit 108.

The process proceeds to step S211, where the timer 123 measuring the notification image display time is started. The process proceeds to step S212, where the value of the timer 123 is compared with a threshold value (T_AR_TH). When it is determined that the value of the timer 123 exceeds the threshold (T_AR_TH), the process proceeds to step S213, where the notification display is disabled, thereby presenting no notification display, then the process will end. That is, by the process from steps S211 to S213, the notification display can be presented for the duration equal to the threshold value (T_AR_TH) and, when the notification display time exceeds the threshold, the notification display can be automatically returned to disabled state.

Specific examples of an input image and a displayed image will be described below in which notification display is presented based on characteristic amount information and information about an operation performed on the console unit 110 according to the present embodiment.

(First Example of Notification Display)

Figure 8:
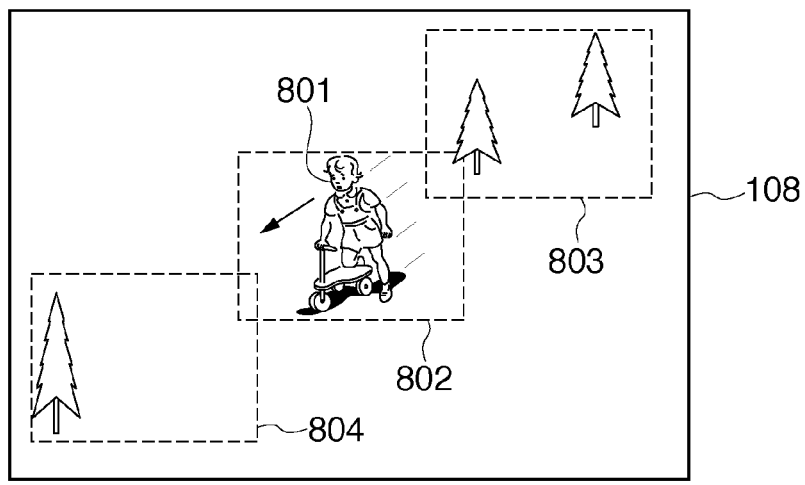
FIG. 8 depicts a view illustrating the relationship between an image input in the image display apparatus according to the present embodiment and an extracted image area.

FIG. 8 depicts a view illustrating an example of the relationship between an image input in the image display apparatus according to the present embodiment and extracted image areas.

In FIG. 8, the whole input image is displayed over the full screen of the display unit 108. Reference numeral 801 denotes a person (subject) moving in the direction indicated by the arrow. Reference numerals 802 to 804 denote exemplary extracted image areas.

For simplicity, it is assumed in the description of the example that mask flags indicating the result of determination described above are set so that only the result of notification display/non-display determination based on face detection information (Flag_1) is used. That is, only the mask flag MASK_1 is set to "1".

It is also assumed that the input image data shown in FIG. 8 is already stored in the memory 103 and the amounts of characteristics of the image areas have been detected at appropriate times.

An example will be described first in which an image area 802 is selected on the console unit 110.

When the image area 802 is selected, the system controller 109 extracts image data in the image area 802 and provides the extracted image data to the main-image processing unit 106. The main-image processing unit 106 scales the image data to the number of pixels (size) of the screen of the display unit 108 and outputs the scaled image data to the image synthesizer 107.

Figure 9:
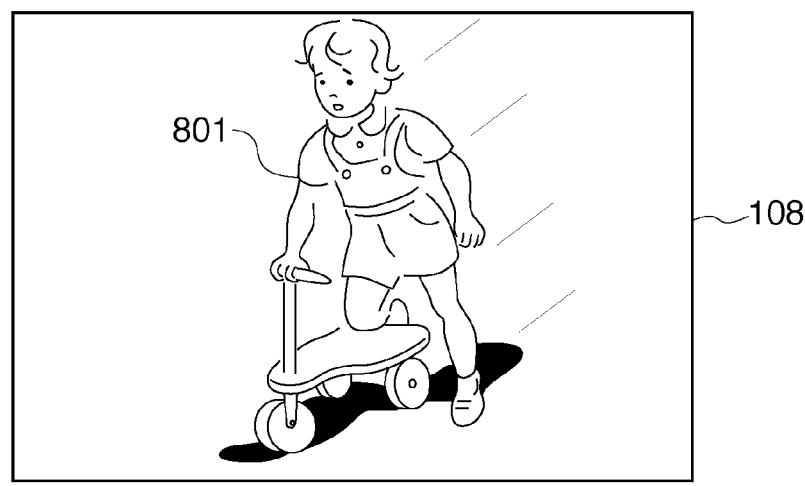
FIG. 9 depicts a view illustrating an exemplary display of an image corresponding to an image area displayed on a screen of a display unit.

FIG. 9 depicts a view illustrating an exemplary display of the image corresponding to the image area 802 thus displayed on the screen of the display unit 108.

The characteristics detection unit 104 performs face detection to find the face of a person 801 in the image data in the image area 802. As a result, the face is detected according to the control flow in FIGS. 2 and 3 described above and therefore the flag (Flag_1) indicating the result of notification display/non-display determination based on face detection information is set to OFF to indicate that the notification display is not needed. Accordingly, the final notification display/non-display determination result flag (Flag_M) is set to "0" according to Equation (1), indicating that the notification display is not needed. In this case, the sub-image processing unit 105 does not generate notification image data. Consequently, only the image data in the image area 802 output from the main-image processing unit 106 is output to the display unit 108. As a result, the image shown in FIG. 9 is displayed on the display unit 108.

The image displayed in FIG. 9 corresponds to the image area 802 in FIG. 8. Here, the image is displayed over the full screen of the display unit 108 as the main window as shown in FIG. 9. Accordingly, the entire image in the image area 802 can be viewed.

Another example will be described next in which an image area 803 in FIG. 8 is selected on the console unit 110.

When the image area 803 is selected, the image data in the image area 803 is extracted. The main-image processing unit 106 scales the extracted image data to the number of the pixels of the screen of the display unit 108 and outputs the scaled image data to the image synthesizer 107.

Figure 10:
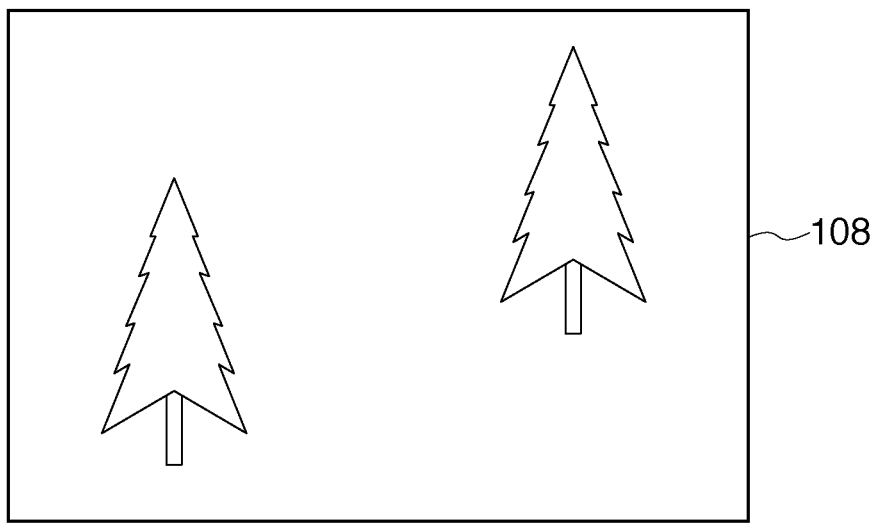
FIG. 10 depicts a view illustrating an exemplary display of an image corresponding to an image area displayed on the screen of the display unit.

FIG. 10 depicts a view illustrating an example of the displayed image corresponding to the image area 803 thus displayed on the screen of the display unit 108.

The characteristics detection unit 104 performs face detection on the basis of the image data in the image area 803. In this case, however, a human face is not included in the image area 803 and is not detected. Since no face is detected through the control flow in FIGS. 2 and 3 described above, the flag (Flag_1) indicating the result of notification display/non-display determination based on face detection information is set to ON ("1") to indicate that the notification display is needed. Consequently, the final notification display/non-display determination result flag (Flag_M) is set to ON ("1") according to Equation (1), indicating that the notification display is needed. When the final notification display/non-display determination result flag (Flag_M) is set to "1" ON) in this way, the sub-image processing unit 105 generates image data representing a notification image shown in FIG. 11 and outputs the image data to the image synthesizer 107.

Figure 11:
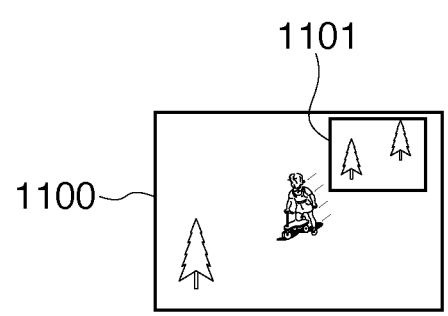
FIG. 11 depicts a view illustrating an example of notification image data.

FIG. 11 depicts a view illustrating an example of a notification image.

In FIG. 11, reference numeral 1100 denotes the entire sub-image which is the whole input image shown in FIG. 8 reduced in size. Reference numeral 1101 denotes the image corresponding to the image area 803. Here, the original image shown in FIG. 8 and the image area 803 are displayed in such a manner that the positional relation between them is maintained and a relative location of the image area 803 to the main image can be identified.

Figure 12:
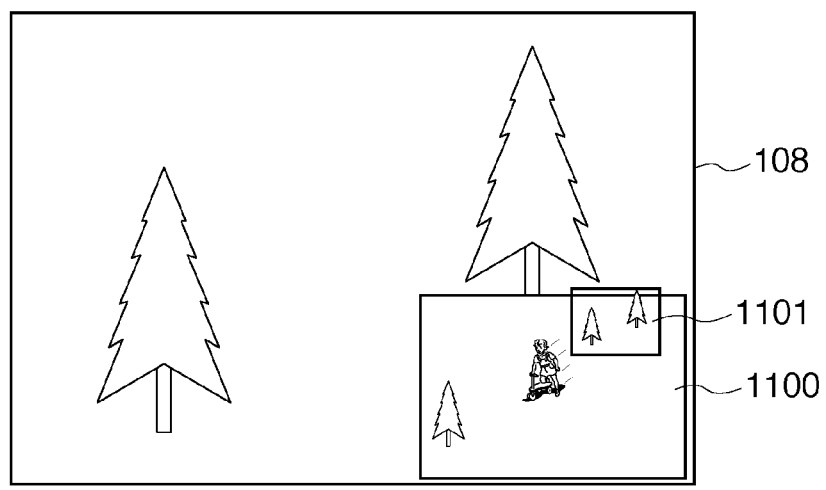
FIG. 12 depicts a view illustrating an exemplary display image generated by combining a sub image with a main image.

The image synthesizer 107 combines the image data of the sub-image (notification image) 1100 shown in FIG. 11 with the main image data shown in FIG. 10 to ultimately display an image shown in FIG. 12 on the display unit 108.

FIG. 12 depicts a view illustrating an example of the displayed image generated by combining the sub image with the main image.

In FIG. 12, the notification image (sub image) 1100 is combined in a portion of the main window (main image). This allows the operator to recognize that an image area including no human face has been extracted.

That is, if an extracted image area includes a human face, the notification display/non-display determination result based on face detection information enables the extracted image area to be displayed over the full screen as the main window as shown in FIG. 9, for example, so that the operator can view the entire extracted image area. On the other hand, if an extracted image area does not include a human face, the notification display as shown in FIG. 12 is presented. Therefore, the operator can extract or select a more preferable image area if needed in an informed manner with the notification display in the sub image in mind.

(Second Example of Notification Display)

A second example will be described in which the above-described mask flags indicating the determination result are set so that only the result of the notification display/non-display determination based on motion information is used (only the mask flag MASK_2 is set to "1"). Again, it is assumed in the example that the same image as in FIG. 8 is input in the image display apparatus. It is also assumed that the input image data is already stored in the memory 103 and the amounts of characteristics of extracted image areas have been detected at appropriate times.

The description will be provided first with respect to an example in which the image area 802 in FIG. 8 is selected at the console unit 110. When the image area 802 is selected, the system controller 109 extracts the image data in the image area 802 and outputs the image data to the main-image processing unit 106. The main-image processing unit 106 scales the image data to the number of pixels of the screen of the display unit 108 and outputs an image as shown in FIG. 9 to the image synthesizer 107 to display the image over the full screen.

The characteristics detection unit 104 detects motion information in the image in the image area 802 to determine the amount of motion of the person 801. If the amount of motion is large, the flag (Flag_2) indicating the result of notification display/non-display determination based on motion information is set to OFF ("0") according to the control flow in FIGS. 2 and 4 described above, thereby indicating that the notification display is not needed. Consequently, the final notification display/non-display determination result flag (Flag_M) is set to OFF ("0") to indicate that the notification display is not needed. In this case, the sub-image processing unit 105 does not generate notification image data. Accordingly, only the main image output from the main-image processing unit 106 is output to the display unit 108. As a result, the image shown in FIG. 9 is displayed on the display unit 108. The image shown in FIG. 9 is the image in an area corresponding to the image area 802 in FIG. 8 and is displayed over the full screen of the display unit 108 as the main window so that the operator can view the whole image of the image area 802.

Another example will be described next in which an image area 804 in FIG. 8 is selected on the console unit 110. When the image area 804 is selected, the image data in the image extraction area 804 is extracted, is scaled to the number of pixels of the display unit 108 by the main-image processing unit 106, output to the image synthesizer 107, and displayed on the display unit 108 (FIG. 13).

Figure 13:
FIG. 13 depicts a view illustrating an example of an image area shown in FIG. 8 that is displayed over the full screen of the display unit.

FIG. 13 depicts a view illustrating the image in the image area 804 shown in FIG. 8 that is displayed over the full screen of the display unit 108.

The characteristics detection unit 104 detects the amount of motion of a subject in the image area 804. In this case, the image area 804 does not include a moving subject and therefore a significant amount of motion of any subject cannot be detected.

However, the notification display controller 109a checks for motion information in neighboring areas of the image area 804 in FIG. 8 by step S403 of FIG. 4. As a result, the amount of motion of a subject 801 having a motion component toward the image area 804 is detected in the neighboring area of the image area 804. Consequently, the process in FIG. 4 proceeds from step S403 to S402, where the flag (Flag_2) indicating the result of notification display/non-display determination based on motion information is set to OFF ("0") to indicate that notification display is not needed. Accordingly, the final notification display/non-display determination result flag (Flag_M) is also set to OFF ("0"), indicating that the notification display is not needed.

When the final notification display/non-display determination result flag (Flag_M) is thus turned off, the sub-image processing unit 105 does not generate notification image data. Accordingly, the image in the image area 804 output from the main-image processing unit 106 is displayed on the display unit 108 as shown in FIG. 13.

Figure 14:
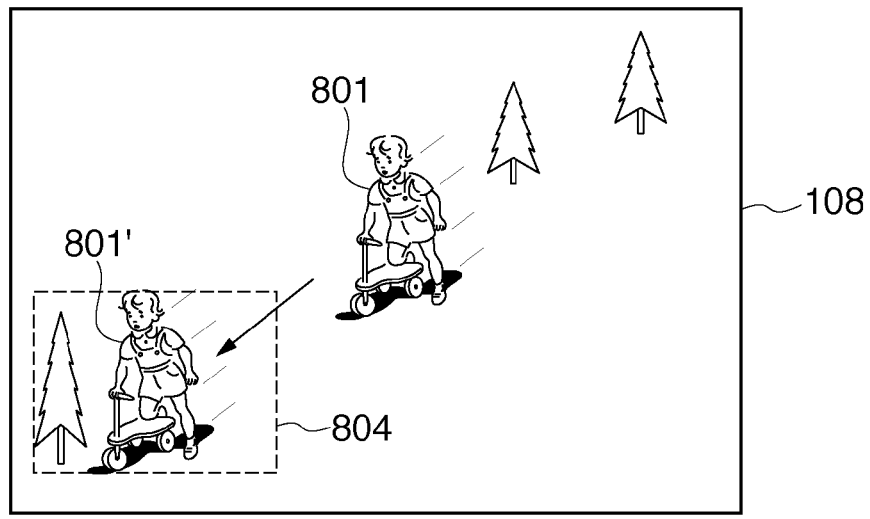
FIG. 14 depicts a view illustrating an exemplary image of the scene shown in FIG. 8 after a period of time has elapsed.

FIG. 14 depicts a view illustrating an example of an image of the image area 804 after a certain period of time has elapsed since the scene shown in FIG. 8.

As shown in FIG. 14, the subject 801 has moved to a location 801' inside the image area 804. Consequently, the display based on the image data output from the main-image processing unit 106 after the period of time has elapsed is as shown in FIG. 15.

Figure 15:
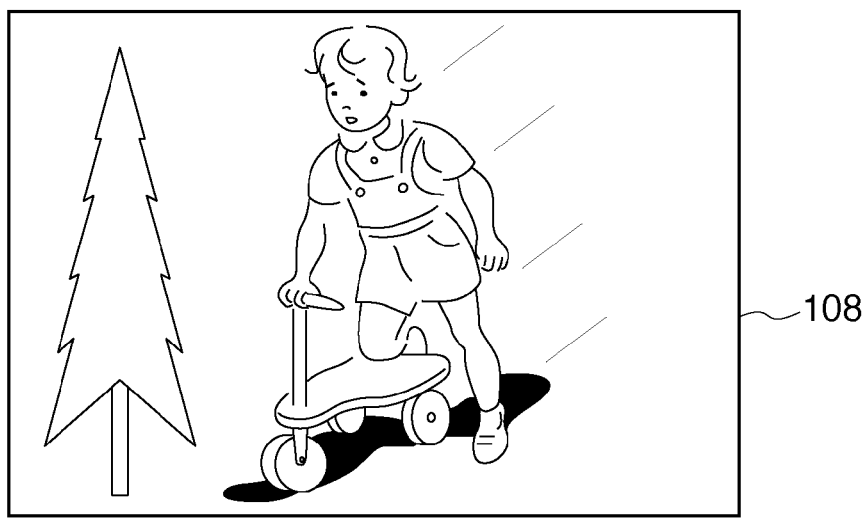
FIG. 15 depicts a view illustrating an exemplary display of an image area shown in FIG. 14.

FIG. 15 depicts a view illustrating an exemplary display of the image in the image area 804 shown in FIG. 14.

In FIG. 15, the entire image area 804 including a subject having a large amount of motion is displayed as the main window.

If the image area 803 in FIG. 8 is selected at the console unit 110 in stead of the image area 804, the image synthesizer 107 combines the sub image (notification image) data shown in FIG. 11 with the main image data shown in FIG. 10 and outputs the composite image to the display unit 108 because the image area 803 does not contain a moving subject and no subject moving toward the interior of the image area 803 is detected in the neighboring area. Therefore, the image shown in FIG. 12 is ultimately displayed on the display unit 108.

In FIG. 12, a notification image 1100 is combined and displayed in a portion of the main window. This allows the operator to recognize that a portion that does not include a moving subject has been extracted as an image area. That is, the notification displays as shown in FIG. 12 allows the operator to extract or select an image area to be extracted if needed in an informed manner with the notification display by the sub image in mind.

When an extracted image area includes a subject that has significantly moved, the use of the notification display/non-display determination based on motion information enables the entire extracted image area to be displayed over the full screen as the main window as shown in FIG. 9 so that the operator can view the complete extracted area.

When an extracted image area does not include a subject that has significantly moved at the time point of the extraction, it is determined whether or not at least one of neighboring areas of the extracted image area includes a subject having the amount of motion toward the extracted image area. If there is such a subject, the extracted image area can be displayed without presenting the notification display.

(Third Example of Notification Display)

A third example will be described in which above-described mask flags that mask the result of determination are set so that only the result of notification display/non-display determination based on frequency distribution information is used (only MASK_3 is set to "1").

Figure 16:
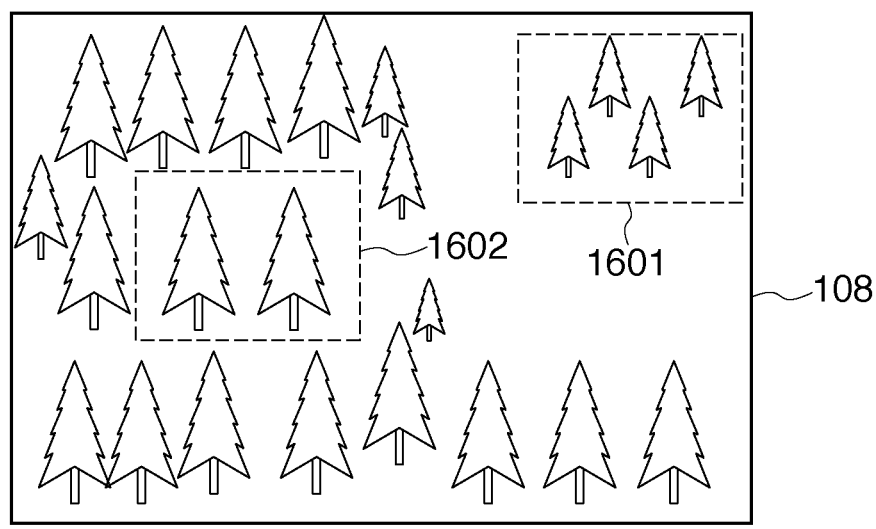
FIG. 16 depicts a view illustrating an exemplary display of an image input in the image display apparatus according to the embodiment in which many subjects that have high frequency components appear.

FIG. 16 depicts a view illustrating an example of an image input in the image display apparatus according to the present embodiment in which many subjects having high frequency components appear.

It is assumed in the example that input image data is already stored in the memory 103 and amounts of characteristics of image areas have been detected at appropriate times. The description will be provided with respect to an example in which an image area 1601 in FIG. 16 is selected at the console unit 110. When the image area 1601 is selected, the system controller 109 extracts the image data in the image area 1601 and outputs the extracted image data to the main-image processing unit 106. The main-image processing unit 106 scales the image data to the number of pixels of the display unit 108 and outputs the scaled image data to the image synthesizer 107. The resulting display is shown in FIG. 17.

The characteristics detection unit 104 detects frequency distributions in the image area 1601 and neighboring image areas. It is determined that the frequency distribution in the image area 1601 is high but the frequency distributions in the neighboring areas are low. Consequently, the flag indicating the result of notification display/non-display determination based on frequency distribution (Flag_3) is set to OFF ("0") according to the control flow in FIGS. 2 and 5 described above to indicate that the notification display is not needed. Therefore the final notification display/non-display determination result flag (Flag_M) is also set to OFF ("0") to indicate that the notification display is not needed.

When the final notification display/non-display determination result flag (Flag_M) is OFF ("0"), the sub-image processing unit 105 does not generate notification image data. Accordingly, only the image in the image area 1601 output from the main-image processing unit 106 is displayed on the display unit 108 as shown in FIG. 17.

Figure 17:
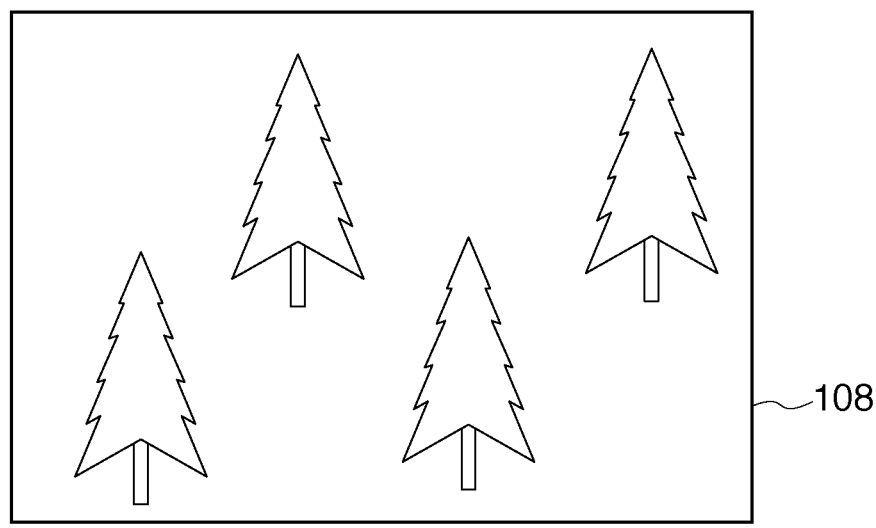
FIG. 17 depicts a view illustrating an exemplary display of an extracted image area 1601 from FIG. 16.

FIG. 17 depicts a view illustrating an example of display of the extracted image area 1601 in FIG. 16.

An example will be described next in which an image area 1602 in FIG. 16 is selected at the console unit 110. When the image area 1602 is selected, the image data in the image area 1602 is extracted. The main-image processing unit 106 scales the extracted image data to the number of pixels of the screen of the display unit 108 and outputs the scaled image data to the image synthesizer 107. As a result, an image as shown in FIG. 18 is displayed on the display unit 108.

Figure 18:
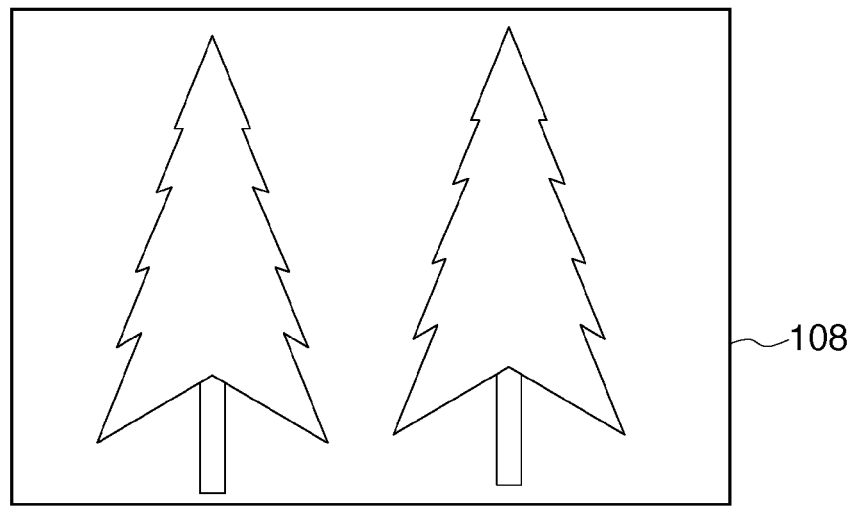
FIG. 18 depicts a view illustrating an exemplary display of an extracted image area 1602 from FIG. 16.

FIG. 18 depicts a view illustrating an example of display of the extracted image area 1602 in FIG. 16.

The characteristics detection unit 104 detects frequency distributions in the image area 1602 and its neighboring image areas. It is determined that the frequency distribution in the image area 1602 is high and those of the neighboring areas are also high. As a result, the flag (Flag_3) indicating the result of notification display/non-display determination based on frequency distribution is set to ON through the control flow in FIGS. 2 and 5 described above to indicate that notification display is needed. Consequently, the final notification display/non-display determination result flag (Flag_M) is also set to ON to indicate that notification display is needed.

Figure 19:
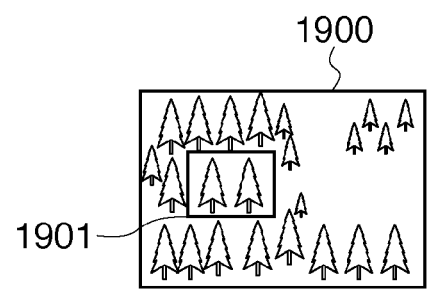
FIG. 19 depicts a view illustrating an example of notification image data generated by a sub-image processing unit.

When the final notification display/non-display determination result flag (Flag_M) is thus turned on, the sub-image processing unit 105 generates notification image data shown in FIG. 19 and outputs it to the image synthesizer 107.

FIG. 19 depicts a view illustrating an example of a notification image generated by the sub-image processing unit 105.

In FIG. 19, reference numeral 1900 denotes a reduced image of the entire notification image and 1901 denotes a reduced image of the extracted image area 1602.

The image synthesizer 107 combines image data of the sub image (notification image) shown in FIG. 19 with the main image data shown in FIG. 18 and outputs the composite image to the display unit 108.

Figure 20:
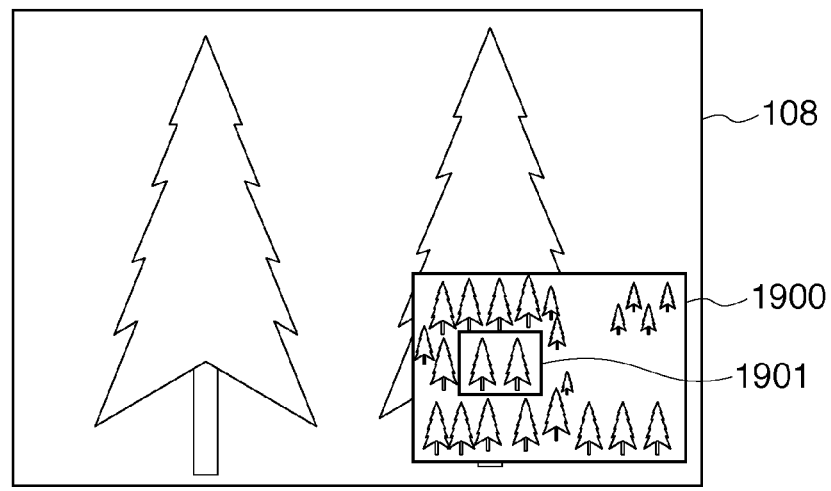
FIG. 20 depicts a view illustrating an exemplary image generated by combining the images in FIGS. 18 and 19.

FIG. 20 depicts a view illustrating an example of the displayed image generated by combining the images in FIGS. 18 and 19.

In FIG. 20, the notification image 1900 is combined in a portion of the main window. This allows the operator to recognize that not only the image area 1602 extracted but also the neighboring areas have a high frequency distribution. That is, when a subject with a high frequency distribution exists only in an extracted image area, the use of the result of notification display/non-display determination based on the frequency distribution enables the image area to be displayed over the full screen of the display unit 108 as the main window as shown in FIG. 17. Accordingly, the operator can view the whole image in the extracted image area. On the other hand, when subjects with high frequency distributions exist in the selected image area and the neighboring area, the notification display as shown in FIG. 20 is presented. This allows the operator to easily identify which portion of the input image corresponds to the currently extracted or selected image area and to easily select and extract a desired image area.

(Other Examples of Display)

One of multiple characteristic amounts is used to determine a final notification display/non-display determination result flag (Flag_M) in the examples described above for simplicity of explanation.

However, all of the multiple characteristic amounts may be used as described with respect to the control flow in FIG. 2. Alternatively, the operator may combine the results of determination based on some of the multiple characteristic amounts as appropriate to determine the final notification display/non-display determination result flag (Flag_M).

While a sub image is combined and displayed in a portion of the main window as a notification display in the present embodiment, the present invention is not limited to the display mode.

Figure 21:
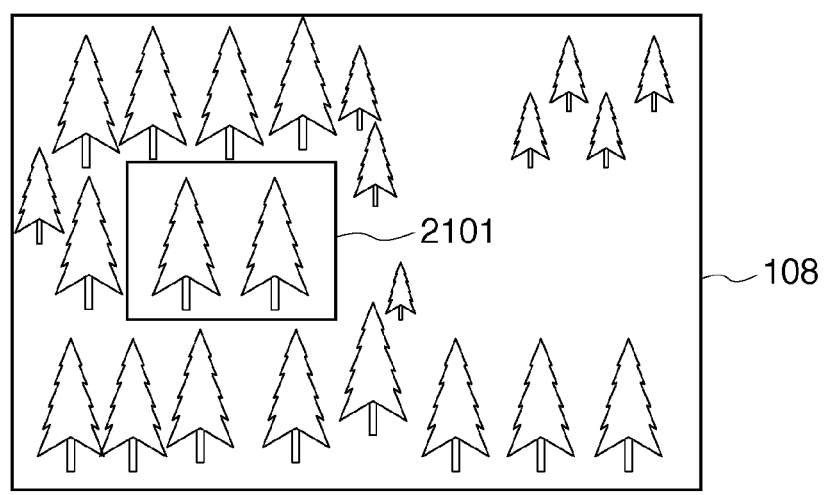
FIG. 21 depicts a view illustrating another exemplary notification display.

FIG. 21 depicts a view illustrating an alternative exemplary display.

For example, when the final notification display/non-display determination result flag (Flag_M) is turned ON, the input image may be displayed over the full screen of the display unit 108 and a marker 2101 indicating an extracted image area may be inserted in the input image as shown in FIG. 21. In this case, the marker 2101 is optional.

[Other Notification Display Control]

Notification display/non-display determination result flags (Flag_1 to Flag_5) that are binary bits associated with characteristic amounts are used to indicate the results of notification display/non-display determination processing in the notification display control described above. However, the result of determination does not need to be a binary value. The essence of the present embodiment is that determination as to whether notification display should be presented or not is made on the basis of multiple characteristic amounts.

FIG. 22 depicts a view illustrating an example of characteristic amount information versus evaluated value for a determination of notification display/non-display.

Evaluated values for the determination of notification display/non-display (Value_1 to Value_5) that depend on the amount of characteristic as shown in FIG. 22 may be output. In this case, weights (Weight_1 to Weight_5) for assigning weights associated with the evaluated values (Value_1 to Value_5) are used. The final evaluated for the determination of notification display/non-display (Value_M) is calculated according to Equation (2) given below:

$$\text{Value\_}M = (\text{Weight\_}1 * \text{Value\_}1) + (\text{Weight\_}2 * \text{Value\_}2) + (\text{Weight\_}3 * \text{Value\_}3) + (\text{Weight\_}4 * \text{Value\_}4) + (\text{Weight\_}5 * \text{Value\_}5) \quad \text{Equation (2)}$$

The evaluated determination value of the notification display/non-display (Value_M) obtained according to Equation (2) may be compared with a threshold value to determine whether to present notification display.

While the amounts of multiple characteristics are used to determine whether to present notification display in the present embodiment, a mode that can be set by a user may be provided in which any notification display is disabled.

In this embodiment; the apparatus can be placed in the notification display-disabled mode by the user setting all the determination result mask flags (MASK_1 to MASK_5) in Equation (1) described above to "0" (OFF).

Alternatively, the apparatus can be placed in the notification display-disabled mode by setting all the weights (Weight_1 to Weight_5) to "0".

A hysteresis may be applied for each threshold crossing detection process in determining whether to present notification display based on each characteristic amount described above, so that notification display is intermittently disabled.

(Other Embodiments)

Exemplary embodiments of the present invention have been described above in detail. The present invention may be applied to a system including multiple apparatuses or may be applied to an apparatus formed by a single device.

The present invention can also be implemented by providing a software program that implements functions of any of the exemplary embodiments described above directly or remotely to a system of an apparatus, whereby the computer of the system or apparatus reads and executes the program provided. In that case, the software does not need to be a program. The software may be any software in any form that has functionality of a program.

Therefore, a program code installed on a computer in order to implement the functions and processing of the present invention by the computer also implements the present invention. That is, the claims of the present invention also include the computer program itself for implementing the functions and processing of the present invention. The program may be in any form that has functionality of a program, such as an object code, a program executed by an interpreter, or script data to be provided to an OS.

The recording medium for providing the program may be any of various types of media such as a floppy (registered trademark) disk, hard disk, optical disk, magneto-optical disk (MO), CD-ROM, CD-R, CD-RW, magnetic tape, non-volatile memory card, ROM, and DVD (DVD-ROM and DVD-R).

The program may also be provided to a client computer by connecting to a Web page on the Internet through a browser of the client computer and downloading the program from the Web page to a recording medium such as a hard disk of the computer. In that case, the computer program of the present invention or a compressed file of the program of the present invention that includes an automatic install function may be downloaded. Furthermore, the program code constituting the program of the present invention may be divided into files and the individual files may be downloaded from different Web pages, thereby implementing the present invention. That is, the claims of the present invention also include a WWW server that allows multiple users to download the program files for implementing the functions and processing of the present invention on computers.

Another implementation is possible in which the program of the present invention is encrypted, stored on storage media such as CD-ROMs, and distributed to users. In this case, users who meet predetermined conditions are allowed to download key information for decrypting the program from a Web page through the Internet, then the users use the key information to install the encrypted program on computers in executable form.

The present invention also can be implemented in a form other than the form in which the functions of any of the exemplary embodiments described above are implemented by a computer reading and executing the program. For example, an OS running on a computer may perform part or all of actual processing in accordance with instructions of the program and the processing can implement the functions of any of the exemplary embodiments described above.

Furthermore, the program read from a recording medium may be written in a memory provided in a function extension board inserted in a computer or a function extension unit attached to a computer. In this case, a CPU or other processor provided in the function extension board or unit can perform part or all of actual processing and the processing can implement the functions of any of the exemplary embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-060080, filed Mar. 10, 2008, which is hereby incorporated by reference herein in its entirety.

What is claimed is:

1. A display apparatus comprising: a determination unit configured to determine an area in a first image; and a controlling unit configured to:
   (a) detect whether a predetermined image relating to a face is included in an image related to the area determined by the determination unit to perform a first process or a second process,
   (b) perform the first process if the predetermined image is not included in the image related to the area determined by the determining unit, and
   (c) perform the second process if the predetermined image is included in the image related to the area determined by the determining unit,
   wherein the first process includes a process for causing a display unit to display a second image and a third image, and the second process includes a process for causing the display unit to display the second image without displaying the third image,
   wherein the second image is generated based on the first image and the area determined by the determination unit, and wherein the third image indicates a relationship between the first image and the area determined by the determination unit,
   wherein the controlling unit performs the second process when a predetermined time period elapses after the third image is displayed if the predetermined image is not included in the image related to the area determined by the determining unit.

2. A method comprising:
determining an area in a first image;
detecting whether a predetermined image relating to a face is included in an image related to a determined area to perform a first process or a second process, wherein the first process includes a process for causing a display unit to display a second image and a third image, and the second process includes a process for causing the display unit to display the second image without displaying the third image, wherein the second image is generated based on the first image and the determined area, and wherein the third image indicates a relationship between the first image and the area; performing the first process if the predetermined image is not included in the image related to the determined area; and performing the second process if the predetermined image is included in the image related to the determined area, wherein the controlling unit performs the second process when a predetermined time period elapses after the third image is displayed if the predetermined image is not included in the image related to the area determined by the determining unit.

3. The display apparatus according to claim 1, wherein the predetermined image includes an image having a change of a luminance that is more than a predetermined value.

4. The display apparatus according to claim 1, wherein the predetermined image includes an image having a change of a color signal that is more than a predetermined value.

5. The display apparatus according to claim 1, wherein the predetermined image includes an image having a difference in a frequency distribution that is more than a predetermined value.

6. The method according to claim 2, further comprising performing the second process when a predetermined time period elapses after the third image is displayed if the predetermined image is not included in the image related to the area.

7. The method according to claim 2, wherein the predetermined image includes an image having a change of a luminance that is more than a predetermined value.

8. The method according to claim 2, wherein the predetermined image includes an image having a change of a color signal that is more than a predetermined value.

9. The method according to claim 2, wherein the predetermined image includes an image having a difference in a frequency distribution that is more than a predetermined value.

* * * * *